(12) United States Patent
Ogawa

(10) Patent No.: US 9,515,581 B2
(45) Date of Patent: Dec. 6, 2016

(54) MOTOR CONTROL DEVICE

(71) Applicant: Kenji Ogawa, Tokyo (JP)

(72) Inventor: Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/651,132

(22) PCT Filed: Dec. 13, 2012

(86) PCT No.: PCT/JP2012/082363
§ 371 (c)(1),
(2) Date: Jun. 10, 2015

(87) PCT Pub. No.: WO2014/091602
PCT Pub. Date: Jun. 19, 2014

(65) Prior Publication Data
US 2015/0326151 A1 Nov. 12, 2015

(51) Int. Cl.
*H02K 7/10* (2006.01)
*H02P 3/22* (2006.01)
(Continued)

(52) U.S. Cl.
CPC ............... *H02P 3/22* (2013.01); *H02P 6/085* (2013.01); *H02P 6/24* (2013.01)

(58) Field of Classification Search
CPC ............... H02P 3/06; H02P 3/04; H02P 3/22; H02P 6/085; H02P 6/24
See application file for complete search history.

(56) References Cited

U.S. PATENT DOCUMENTS 4,095,154 A * 6/1978 Williamson ............ H02P 3/14
318/376
4,843,292 A 6/1989 Ono et al.
(Continued)

FOREIGN PATENT DOCUMENTS

JP 62-181684 A 8/1987
JP 63-213484 A 9/1988
(Continued)

OTHER PUBLICATIONS

English translation of Taiwanese Search Report for corresponding Taiwanese application No. 102122935 dated Dec. 4, 2014.
(Continued)

*Primary Examiner* — Karen Masih
(74) *Attorney, Agent, or Firm* — Sughrue Mion, PLLC; Richard C. Turner

(57) ABSTRACT

Provided is a motor control device that includes an inverter circuit that includes a plurality of P-side switching elements and a plurality of N-side switching elements and drives a motor via a plurality of motor terminals; a first dynamic brake that brakes the motor by turning on all the phases of the plurality of P-side switching elements or turning on all the phases of the plurality of N-side switching elements; a second dynamic brake that brakes the motor by connecting dynamic brake resistors between the motor terminals; and a control unit that switches, according to the motor speed, between the first dynamic brake and the second dynamic brake, which are the dynamic brakes that brake the motor.

8 Claims, 7 Drawing Sheets

(51) Int. Cl.
*H02P 6/08* (2016.01)
*H02P 6/24* (2006.01)

(56) References Cited

U.S. PATENT DOCUMENTS

| | | |
|---|---|---|
| 2003/0102833 A1 | 6/2003 | Murakami |
| 2004/0160208 A1 | 8/2004 | Youm et al. |

FOREIGN PATENT DOCUMENTS

| | | |
|---|---|---|
| JP | 04-008185 A | 1/1992 |
| JP | 04-012686 A | 1/1992 |
| JP | 05-111273 A | 4/1993 |
| JP | 08-149870 A | 6/1996 |
| JP | 11-206184 A | 7/1999 |
| JP | 2004-274991 A | 9/2004 |
| JP | 3863529 B2 | 12/2006 |
| JP | 2007-068400 A | 3/2007 |
| JP | 2007-282460 A | 10/2007 |
| JP | 2009-284575 A | 12/2009 |

OTHER PUBLICATIONS

International Search Report for PCT/JP2012/082363 dated Feb. 12, 2013.
Communication dated Nov. 4, 2015 from the Japanese Patent Office in counterpart application No. 2014-551805.

\* cited by examiner

MOTOR CONTROL DEVICE

CROSS REFERENCE TO RELATED APPLICATIONS

This application is a National Stage of International Application No. PCT/JP2012/082363 filed Dec. 13, 2012, the contents of all of which are incorporated herein by reference in their entirety.

FIELD

The present invention relates to a motor control device.

BACKGROUND

While a motor control device is driving a motor, if an abnormality occurs in the motor or the motor control device, it is necessary to immediately stop the motor for safety reasons. As a stopping method used during such an immediate stop, there is a dynamic braking method using brake resistors, where resistors are connected between motor terminals so as to short-circuit the motor terminals, thereby stopping the motor.

During a dynamic braking stop using brake resistors when a motor crash stops, an excessive current flows, which causes damage to the motor or demagnetization of magnets in the motor. Therefore, in order that the current that flows into the motor does not become excessive, an appropriate dynamic brake resistor is selected. With the selected dynamic brake resistor, when the rotation speed of the motor is reduced corresponding to the characteristic (that is, the constant) of the motor to which the dynamic brake resistor is connected, deceleration torque becomes small, and the deceleration period of time from the starting to stopping of the deceleration tends to be long. Therefore, heretofore, reduction of the motor stoppage distance during an immediate stop has been difficult.

Patent Literature 1 describes a technique in which, in a motor control device, when an overcurrent of a motor is transmitted to brake resistors by turning on a brake relay when braking the motor and causing a short circuit between motor windings, the duty ratio of the switching operation of the switching element on the upper side of the inverter unit is controlled. Therefore, the amount of overcurrent consumed by the brake resistors changes in proportion to the rotation speed of the motor. If this technique according to Patent Literature 1 is used, when the rotation speed of the motor is high, because the amount of overcurrent consumed by the brake resistors is increased, it is thought that a breakdown of the motor and the brake relay due to overcurrent can be prevented even when the capacity of the brake resistors is reduced.

Patent Literature 2 describes a technique in which, in an inverter control device, when a servo motor is immediately stopped, the current that flows into the dynamic brake resistors is controlled such that it is kept constant. When using this technique according to Patent Literature 2, because the rotation speed of the servo motor decreases linearly, it is assumed that the coasting distance of the servo motor from when the immediate stop command is output to when the servo motor actually stops can be shortened.

CITATION LIST

Patent Literatures

Patent Literature 1: Japanese Patent No. 3863529
Patent Literature 2: Japanese Patent Application Laid-open No. H11-206184

SUMMARY

Technical Problem

Each of the techniques described in Patent Literatures 1 and 2 is based on an assumption that dynamic brake resistors are used to stop a motor. Therefore, there is a limit to the reduction of the time it takes a motor to stop (hereafter, motor stoppage time) and the distance travelled before a motor stops (hereafter, motor stoppage distance) during an immediate stop.

The present invention has been achieved in view of the above problem, and an objective of the present invention is to provide a motor control device that can significantly reduce the motor stoppage time and the motor stopping distance during an immediate stop.

Solution to Problem

In order to solve the problem and achieve the objective mentioned above, the present invention relates to a motor control device that includes: an inverter circuit that includes a plurality of P-side switching elements and a plurality of N-side switching elements, and drives a motor via a plurality of motor terminals; a first dynamic brake that brakes the motor by turning on all phases of the plurality of P-side switching elements or all phases of the plurality of N-side switching elements; a second dynamic brake that brakes the motor by connecting dynamic brake resistors between the plurality of motor terminals; and a control unit that switches, according to the motor speed, between the first dynamic brake and the second dynamic brake, which are the dynamic brakes that brake the motor.

Advantageous Effects of Invention

According to the present invention, a dynamic brake that brakes a motor is switched between a first dynamic brake and a second dynamic brake by a control unit in accordance with the motor speed. By using this configuration, a dynamic brake system suitable for reducing the motor stoppage time and the motor stoppage distance can be selected in accordance with the motor speed, and thus the motor stoppage time and the motor stoppage distance during an immediate stop can be significantly reduced.

DESCRIPTION OF EMBODIMENTS

Exemplary embodiments of a motor control device according to the present invention will be explained below in detail with reference to the accompanying drawings. The present invention is not limited to the embodiments.

First Embodiment

Figure 1:
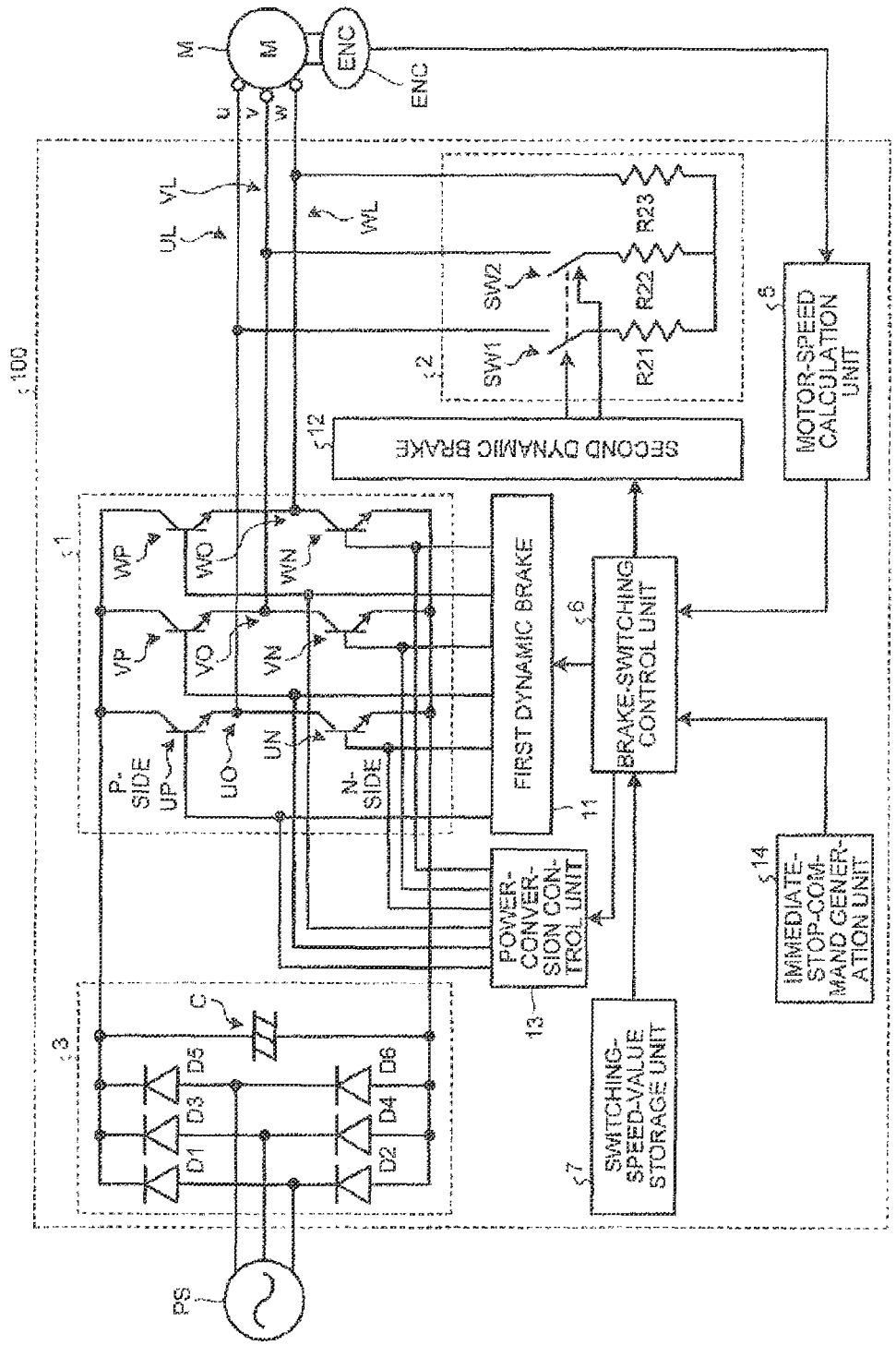
FIG. 1 is a diagram illustrating a configuration of a motor control device according to a first embodiment.

A motor control device 100 according to a first embodiment is explained with reference to FIG. 1. FIG. 1 is a diagram illustrating a configuration of the motor control device 100. The motor control device 100 receives power (for example, three-phase alternating-current power) from a power source (for example, an alternating-current power source) PS, performs a power conversion operation on the received power, drives a motor M using generated driving power (for example, three-phase alternating-current power), and drives various machines including the motor M.

The motor control device 100 includes, for example, a converter circuit 3, an inverter circuit 1, and a power-conversion control unit 13.

The converter circuit 3 receives alternating-current power (of, for example, an R-phase, an S-phase, and a T-phase) from the power source PS, and then it converts the received alternating-current power into direct-current power and outputs the converted power to the inverter circuit 1. The converter circuit 3 includes, for example, a plurality of diodes D1 to D6 and a smoothing capacitor C. For example, the converter circuit 3 rectifies alternating-current power with the plurality of diodes D1 to D6, smooths the rectified direct-current power with the smoothing capacitor C, and outputs the smoothed direct-current power to the inverter circuit 1.

The inverter circuit 1 receives direct-current electric power from the converter circuit 3 and converts the received direct-current power into alternating-current electrical power (of, for example, a U-phase, a V-phase, and a W-phase). The inverter circuit 1 includes, for example, a plurality of P-side switching elements UP, VP, WP and a plurality of N-side switching elements UN, VN, WN. For example, each of elements of the plurality of P-side switching elements UP, VP, WP respectively corresponds to a U-phase, a V-phase, and a W-phase of three-phase alternating-current electrical power to be converted. For example, each of elements the plurality of N-side switching elements UN, VN, WN respectively corresponds to a U-phase, a V-phase, and a W-phase of the three-phase alternating-current electrical power to be converted.

The power-conversion control unit 13 controls the power conversion operation performed by the inverter circuit 1. That is, the power-conversion control unit 13 controls the inverter circuit 1 as it converts direct-current electrical power into alternating-current electrical power by causing each element of the plurality of P-side switching elements UP, VP, and WP and each of the N-side switching elements UN, VN, and WN to perform a switching operation at a predetermined time.

The inverter circuit 1 outputs converted alternating-current electrical power to the motor M via power lines UL, VL, and WL of respective phases, thereby driving the motor M. The power lines UL, VL, and WL of the respective phases respectively connect output nodes UO, VO, and WO of respective phases in the inverter circuit 1 to motor terminals U, V, and W of respective phases in the motor M. That is, the inverter circuit 1 drives the motor M via the plurality of motor terminals U, V, and W.

In a case where an abnormality occurs in the motor M or the motor control device 100 when the inverter circuit 1 is driving the motor M, the motor M needs to be stopped immediately for safety reasons.

In the first embodiment, as a stopping method during an immediate stop, the following two dynamic brake systems are taken into account: one is a dynamic brake system using switching elements and in which a motor is stopped by causing a short circuit between motor terminals with the switching elements; and the other is a dynamic brake system using brake resistors and in which a motor is stopped by connecting a resistor between motor terminals and causing a short circuit between the motor terminals.

Specifically, the motor control device 100 further includes a first dynamic brake 11, a brake resistor circuit 2, and a second dynamic brake 12.

The first dynamic brake 11 brakes the motor M by controlling the inverter circuit 1 such that it turns on all the phases of the plurality of P-side switching elements or all the phases of the plurality of N-side switching elements. For example, the first dynamic brake 11 maintains a state where all of the plurality of N-side switching elements UN, VN, and WN are turned off, as well as a state where all of the plurality of the P-side switching elements UP, VP, and WP are turned on. Alternatively, for example, the first dynamic brake 11 maintains a state where all of the plurality of P-side switching elements UP, VP, and WP are turned off, as well as a state where all of the plurality of N-side switching elements UN, VN, and WN are turned on. By using this configuration, the motor terminals of the plurality of motor terminals U, V, and W are short circuited from one another, thereby acting as a brake on the motor M.

The brake resistor circuit 2 is configured to be switchable between a state where a dynamic brake resistor is connected between each of terminals of the plurality of motor terminals U, V, and W and a state where no dynamic brake resistor is connected between them. For example, the brake resistor circuit 2 is configured to be switchable between a state where a dynamic brake resistor is connected between each of the plurality of power lines UL, VL, and WL and a state where no dynamic brake resistor is connected between them. Specifically, the brake resistor circuit 2 includes a plurality of switches SW1 and SW2 and a plurality of dynamic brake resistors R21, R22, and R23.

For example, one end of the switch SW1 is connected to the power line UL and the other end thereof is connected to the dynamic brake resistor R21. One end of the switch SW2 is connected to the power line VL and the other end thereof is connected to the dynamic brake resistor R22. One end of the dynamic brake resistor R21 is connected to the switch SW1 and the other end thereof is connected to the dynamic brake resistors R22 and R23. One end of the dynamic brake resistor R22 is connected to the switch SW2 and the other end thereof is connected to the dynamic brake resistors R21 and R23. One end of the dynamic brake resistor R23 is connected to the power line WL and the other end thereof is connected to the dynamic brake resistors R21 and R22.

The second dynamic brake 12 controls the brake resistor circuit 2 such that it respectively connects the dynamic brake resistors R21 and R23 between motor terminals of the plurality of motor terminals U, V, and W, thereby braking the motor M. For example, the second dynamic brake 12 turns on the plurality of switches SW1 and SW2 to respectively connect the dynamic brake resistors R21 to R23 between the motor terminals of the plurality of motor terminals U, V, and W. By using this configuration, the plurality of motor terminals U, V, and W are short circuited from one another respectively via the dynamic brake resistors R21 to R23, thereby braking the motor M.

In this example, is it assumed to be a case where the first dynamic brake 11 is not provided in the motor control device 100. In this case, during an immediate stop, the second dynamic brake 12 always brakes the motor M. During a dynamic braking stop using the dynamic brake resistors R21 to R23, if an excessive current flows during the crash stop of a motor, the motor becomes damaged or the magnets thereof become demagnetized. Therefore, appropriate resistance values of the dynamic brake resistors R21 to R23 are selected so as to prevent the current flowing into the motor from becoming excessive. In the dynamic brake resistors R21 to R23 selected in this manner, when the rotation speed of the motor is reduced corresponding to the characteristic (that is, the constant) of the motor to which the dynamic brake resistors R21 to R23 are connected, the deceleration torque is reduced and thus there is a possibility that the motor stoppage time period and the motor stoppage distance from when the motor starts to decelerate to the time when the motor actually stops become long.

For example, the relation between motor speed and torque current (that is, braking torque) during dynamic brake using dynamic brake resistors is given by the following relational expression (Expression 1). That is, a torque current $I_{THW}$ during a dynamic brake operation by a dynamic brake resistor is expressed by the following (Expression 1):

$$I_{THW} = E \times N \times \frac{R1 + R2}{(R1 + R2)^2 + (2\pi PLN/120)^2} \quad \text{(Expression 1)}$$

In the expression (Expression 1), E is an inductive voltage constant [V/(r/min)], N is a rotation speed of a servo motor [r/min], R1 is an armature resistance [Ω], R2 is a dynamic brake resistance [Ω], L is an armature inductance [H], and P is the number poles a motor has. The expression (Expression 1) is expressed in a graph and is represented by the one-dot chain line in FIG. 2. As indicated by the one-dot chain line in FIG. 2, as for a dynamic brake using dynamic brake resistors, while the torque current is large when the motor speed is high, when the motor speed becomes low, there is a tendency for the torque current to be attenuated. Accordingly, as indicated by the one-dot chain line in FIG. 4, it is understood that deceleration time and deceleration distance become long when the motor speed becomes low, whereas deceleration time and deceleration distance become short when the motor speed is high.

As an alternative, a case is assumed where the second dynamic brake 12 is not provided in the motor control device 100. In this case, during an immediate stop, the first dynamic brake 11 always brakes the motor M. During a dynamic braking stop using switching elements, according to the type of the characteristic (that is, the constant) of the motor to which the dynamic brake resistors R21 to R23 are connected, excessive current flows in a case where the rotation speed of the motor is high. Therefore, there is a possibility that the motor breaks down, and there is also a possibility that the deceleration torque becomes small due to a back electromotive force or the like, and thus the motor stoppage time period and the motor stoppage distance become long between when the motor starts to decelerate and the time when the motor stops.

For example, for the relation between motor speed and torque current (that is, braking torque) during dynamic braking using switching elements, the following relational expression (Expression 2) has been established. That is, a torque current $I_{SW}$ during a dynamic braking operation by a switching element is expressed by the following expression (Expression 2).

$$I_{SW} = E \times N \times \frac{R1}{(R1)^2 + (2\pi PLN/120)^2} \quad \text{(Expression 2)}$$

In the expression (Expression 2), E is an inductive voltage constant [V/(r/min)], N is a rotation speed of a servo motor [r/min], R1 is an armature resistance [Ω], L is an armature inductance [H], and P is the number of poles the motor has. When the expression (Expression 2) is expressed in a graph, it is represented by the two-dot chain line in FIG. 2. As indicated by the two-dot chain line in FIG. 2, for dynamic brake using switching elements, while the torque current is large when the motor speed is low, when the motor speed becomes high, there is a tendency for the torque current to be attenuated. Accordingly, as indicated by the two-dot chain line in FIG. 4, it is understood that the deceleration time and the deceleration distance become long when the motor speed becomes high, whereas the deceleration time and the deceleration distance become short when the motor speed is low.

As described above, in a dynamic braking system in which dynamic brake of the system is fixed as one of the first dynamic brake 11 and the second dynamic brake 12, there is a limitation in the reduction of the motor stoppage time and the motor stoppage distance during an immediate stop.

Therefore, the first embodiment is directed to significantly reduce the motor stoppage time and the motor stoppage distance during an immediate stop by means of switching between the first dynamic brake 11 and the second dynamic brake 12 in accordance with the motor speed.

Specifically, the motor control device 100 further includes an immediate-stop-command generation unit 14, a motor-speed calculation unit 5, a switching-speed-value storage unit 7, and a brake-switching control unit 6. When the inverter circuit 1 is driving the motor M, and if an abnormality occurs in the motor M or the motor control device 100, the immediate-stop-command generation unit 14 generates an immediate stop command. For example, the immediate-stop-command generation unit 14 can generate an immediate stop command in response to an immediate stop button being pressed. Alternatively, for example, the immediate-stop-command generation unit 14 can generate an immediate stop command by monitoring the operating state of the motor M or that of the motor control device 100 and in response to an abnormality in the motor M or the motor control device 100 being detected. The immediate-stop-command generation unit 14 sends a generated immediate stop command to the brake-switching control unit 6.

The motor-speed calculation unit 5 receives information on a motor position from, for example, a position detector ENC that detects the position of the motor M. The motor-speed calculation unit 5 calculates the motor speed on the basis of the motor position and supplies the calculated motor speed to the brake-switching control unit 6.

The switching-speed-value storage unit 7 stores a dynamic-brake switching speed therein. The dynamic-brake switching speed is a value that becomes a reference when switching between a dynamic brake using dynamic brake resistances and a dynamic brake using switching elements.

For example, on the basis of Expression 1 and Expression 2 described above, a condition of a motor speed N, with which braking torque is increased by performing dynamic braking using dynamic brake resistors, is calculated using the following expression (Expression 3).

$$N > \frac{\sqrt{(R1+R2) \times R1}}{2\pi PL/120} \quad \text{(Expression 3)}$$

Figure 2:
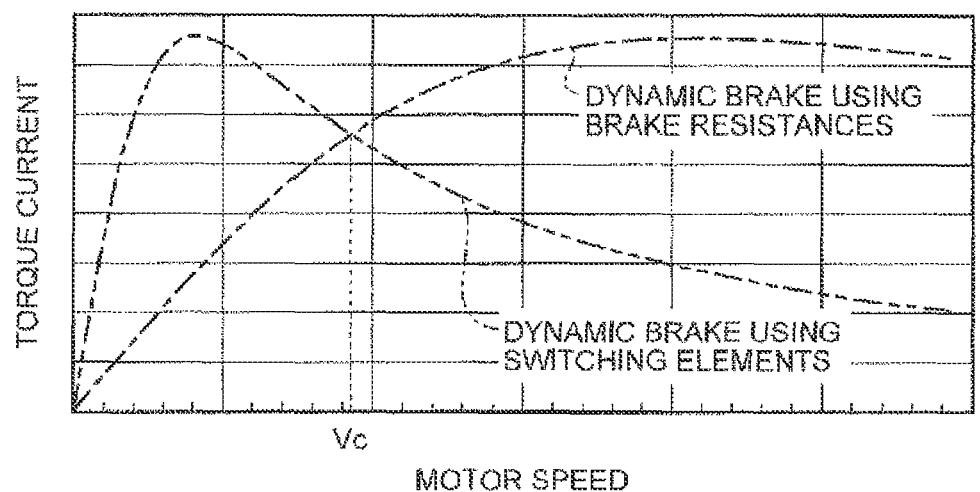
FIG. 2 is a diagram illustrating the relation between motor speed and torque current in two dynamic brake systems in the first embodiment.

That is, in the expression (Expression 3), the right side value is a dynamic-brake switching speed. The right side value in the expression (Expression 3) is, for example, denoted as a dynamic-brake switching speed Vc in FIGS. 2 and 4. The dynamic-brake switching speed Vc can be assumed as a boundary at which the characteristic of a dynamic brake using dynamic brake resistors and the characteristic of a dynamic brake using switching elements are reversed. For example, as illustrated in FIG. 2, the dynamic-brake switching speed Vc can be assumed to be a boundary at which a magnification relation of torque currents with respect to the same motor speed is reversed. The switching-speed-value storage unit 7 stores therein, as a dynamic-brake switching speed, the right side value of the expression (Expression 3) calculated in advance on the basis of a motor constant and the like.

Upon reception of an immediate stop command from the immediate-stop-command generation unit 14, the brake-switching control unit 6 acquires a motor speed from the motor-speed calculation unit 5, and then it acquires a dynamic-brake switching speed from the switching-speed-value storage unit 7. Thereafter, depending on the acquired motor speed, the brake-switching control unit 6 switches between the first dynamic brake 11 and the second dynamic brake 12 such that one of them brakes the motor M.

For example, the brake-switching control unit 6 compares the motor speed acquired from the motor-speed calculation unit 5 and the dynamic-brake switching speed acquired from the switching-speed-value storage unit 7, and according to the comparison result, switches a dynamic brake that brakes the motor M between the first dynamic brake 11 and the second dynamic brake 12. For example, the brake-switching control unit 6 performs switching such that, when the motor speed is higher than the dynamic-brake switching speed, the second dynamic brake 12 brakes the motor M and, when the motor speed is lower than the dynamic-brake switching speed, the first dynamic brake 11 brakes the motor M.

For example, when the motor speed is higher than the dynamic-brake switching speed, the brake-switching control unit 6 selects the second dynamic brake 12. That is, the brake-switching control unit 6 deactivates the first dynamic brake 11 and activates the second dynamic brake 12. By using this configuration, the second dynamic brake 12 controls the brake resistor circuit 2; and the dynamic brake resistors R21 to R23 are respectively connected between the terminals of the plurality of motor terminals U, V, and W, thereby braking the motor M.

For example, when the motor speed is lower than the dynamic-brake switching speed, the brake-switching control unit 6 selects the first dynamic brake 11. That is, the brake-switching control unit 6 activates the first dynamic brake 11 and deactivates the second dynamic brake 12. By using this configuration, the first dynamic brake 11 controls the inverter circuit 1; and all phases of the plurality of P-side switching elements or all phases of the plurality of N-side switching elements are turned on, thereby braking the motor M.

The brake-switching control unit 6 can perform such comparison and switching operations continuously or regularly from the time when an immediate stop begins.

Figure 3:
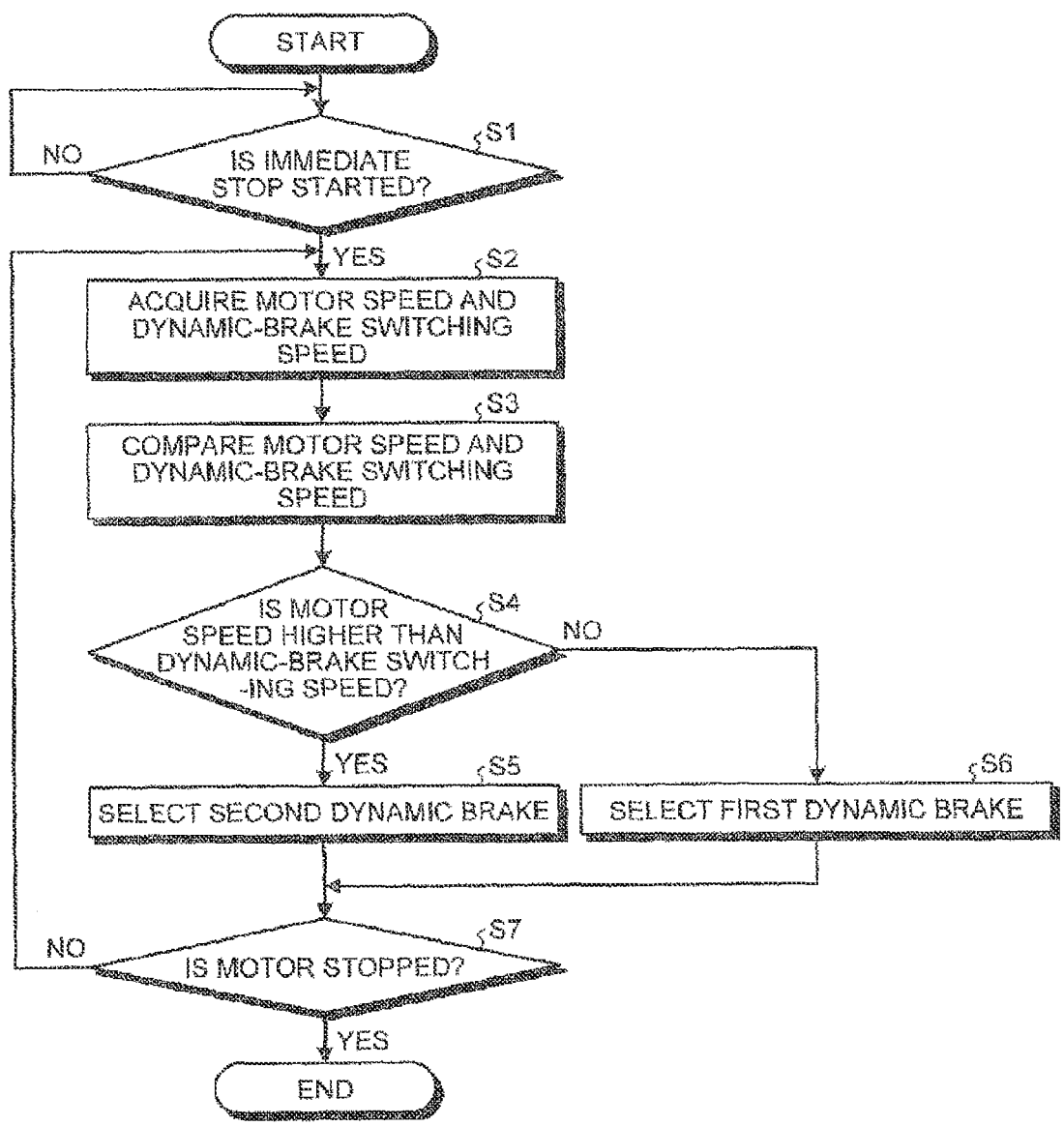
FIG. 3 is a flowchart illustrating the operation of the motor control device according to the first embodiment.

An operation of the motor control device 100 is described next with reference to FIG. 3. FIG. 3 is a flowchart illustrating an operation of the motor control device 100.

At Step S1, the brake-switching control unit 6 determines whether an immediate stop should be started. For example, upon reception of an immediate stop command from the immediate-stop-command generation unit 14, the brake-switching control unit 6 determines that an immediate stop should be started (YES at Step S1), and the process proceeds to Step S2; and when the brake-switching control unit 6 has not received an immediate stop command from the immediate-stop-command generation unit 14, the brake-switching control unit 6 determines that an immediate stop should not be started (NO at Step S1), and the process proceeds to Step S1.

At Step S2, the brake-switching control unit 6 stops the control operation of the power-conversion control unit 13, and it acquires the motor speed and the dynamic-brake switching speed. For example, the brake-switching control unit 6 acquires a motor speed from the motor-speed calculation unit 5, and it acquires a dynamic-brake switching speed from the switching-speed-value storage unit 7.

At Step S3, the brake-switching control unit 6 compares the motor speed and the dynamic-brake switching speed.

At Step S4, the brake-switching control unit 6 determines whether the motor speed is higher than the dynamic-brake switching speed. When the motor speed is higher than the dynamic-brake switching speed (YES at Step S4), the brake-switching control unit 6 advances the process to Step S5 and, when the motor speed is equal to or lower than the dynamic-brake switching speed (NO at Step S4), the brake-switching control unit 6 advances the process to Step S6.

At Step S5, the brake-switching control unit 6 selects the second dynamic brake 12. That is, the brake-switching control unit 6 deactivates the first dynamic brake 11 and activates the second dynamic brake 12. By using this configuration, the second dynamic brake 12 controls the brake resistor circuit 2, and the dynamic brake resistors R21 to R23 are respectively connected between the plurality of motor terminals U, V, and W, thereby braking the motor M.

At Step S6, the brake-switching control unit 6 selects the first dynamic brake 11. That is, the brake-switching control unit 6 activates the first dynamic brake 11 and deactivates the second dynamic brake 12. By using this configuration, the first dynamic brake 11 controls the inverter circuit 1, and all the phases of the plurality of P-side switching elements or all the phases of the plurality of N-side switching elements are turned on, thereby braking the motor M.

At Step S7, the brake-switching control unit 6 determines whether the motor M is stopped. For example, the brake-switching control unit 6 acquires the motor speed from the motor-speed calculation unit 5 and determines whether the motor speed is zero. When the motor M is stopped (YES at Step S7), the brake-switching control unit 6 ends the process and, when the motor M is not stopped (NO at Step S7), the brake-switching control unit 6 returns the process to Step S2.

In this manner, by repeating a loop of Step S2 to Step S7 for a plurality of times, the comparing and switching operations can be performed continuously or regularly.

As described above, according to the first embodiment, in the motor control device 100, the brake-switching control unit 6 switches in accordance with the motor speed between the dynamic braking, which brakes the motor M, of the first dynamic brake 11 and the second dynamic brake 12. By using this configuration, it is possible to select a dynamic brake system suitable for reducing the motor stoppage time and the motor stoppage distance according to the motor speed. Therefore, the motor stoppage time and the motor stoppage distance during an immediate stop can be significantly shortened.

Furthermore, according to the first embodiment, in the motor control device 100, the brake-switching control unit 6 compares, continuously or regularly from the start of the immediate stop, the motor speed detected by using the position detector ENC with a dynamic-brake switching speed stored in the switching-speed-value storage unit 7 and, according to the comparison result, it switches between the first dynamic brake 11 and the second dynamic brake 12, which are the dynamic brakes that brake the motor M. By using this configuration, it is possible to select a dynamic brake system suitable for reducing motor stoppage time and the motor stoppage distance at respective stages from the beginning of immediate stop, and thus it is possible to effectively brake the motor M.

Further, according to the first embodiment, in the motor control device 100, the brake-switching control unit 6 performs switching such that, when the motor speed is higher than the dynamic-brake switching speed, the second dynamic brake 12 brakes the motor M and, when the motor speed is lower than the dynamic-brake switching speed, the first dynamic brake 11 brakes the motor M. For example, as indicated by the solid line in FIG. 4, when the motor speed is higher than the dynamic-brake switching speed Vc, similarly to the case indicated by the one-dot chain line, the deceleration time and the deceleration distance can be shortened and, when the motor speed is lower than the dynamic-brake switching speed Vc, similarly to the case indicated by the two-dot chain line, the deceleration time and the deceleration distance can be shortened. That is, it is possible to select a dynamic brake system suitable for reducing the motor stoppage time and the motor stoppage distance simply by using a dynamic-brake switching speed set at a boundary point around which the characteristics of a dynamic brake using dynamic brake resistors and the characteristics of a dynamic brake using switching elements are reversed. Therefore, the motor stoppage time and the motor stoppage distance during an immediate stop can be significantly shortened (for example, shortened to minimum).

Figure 4:
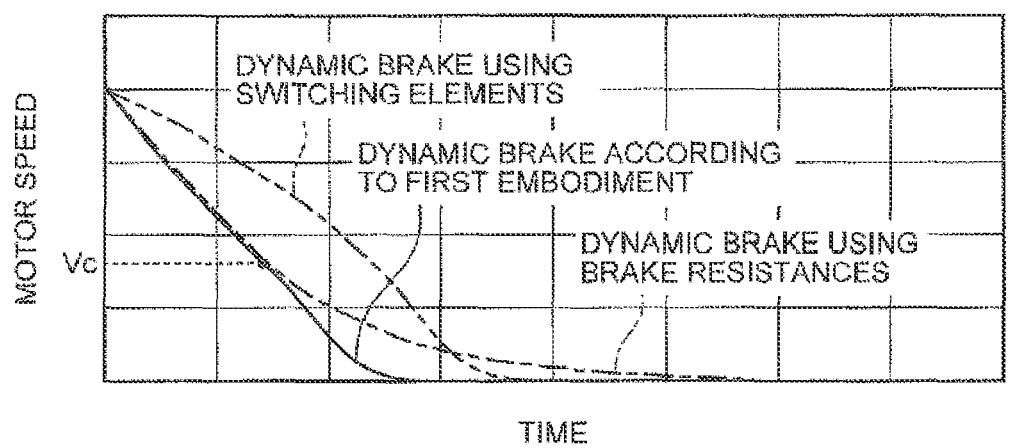
FIG. 4 is a diagram illustrating the effects of the first embodiment.

For example, as indicated by the solid line in FIG. 4, the characteristic of the dynamic brake according to the first embodiment can be set such that the motor stoppage time and the motor stoppage distance thereof can be made shorter than those in the characteristic (indicated by the one-dot chain line in FIG. 4) of the dynamic brake using dynamic brake resistors and those in the characteristic (indicated by the two-dot chain line in FIG. 4) of the dynamic brake using switching elements.

When a speed detector (not illustrated) is used in the motor M instead of the position detector ENC, in the configuration illustrated in FIG. 1, the motor-speed calculation unit 5 can be omitted. In this configuration, the brake-switching control unit 6 acquires the motor speed detected by a speed detector.

Alternatively, at Step S4 illustrated in FIG. 3, it is also possible that the brake-switching control unit 6 determines whether the motor speed is equal to or higher than the dynamic-brake switching speed. In this case, when the motor speed is equal to or higher than the dynamic-brake switching speed (YES at Step S4), the brake-switching control unit 6 advances the process to Step S5 and, when the motor speed is lower than the dynamic-brake switching speed (NO at Step S4), the brake-switching control unit 6 advances the process to Step S6.

Alternatively, at Step S4 illustrated in FIG. 3, it is possible to configure the brake-switching control unit 6 such that it determines whether it is a first state, where the motor speed is higher than the dynamic-brake switching speed; a second state, where the motor speed is equal to the dynamic-brake switching speed; or a third state, where the motor speed is lower than the dynamic-brake switching speed. In this case, it is possible to configure, when the motor speed is in the first state, the brake-switching control unit 6 such that it advances the process to Step S5; when the motor speed is in the second state, the brake-switching control unit 6 such that it advances the process to Step S7; and when the motor speed is in the third state, the brake-switching control unit 6 such that it advances the process to Step S6. In this example, the case where the motor speed is in the second state can be set as a dead band in a control operation, thereby stabilizing the control operation.

Figure 5:
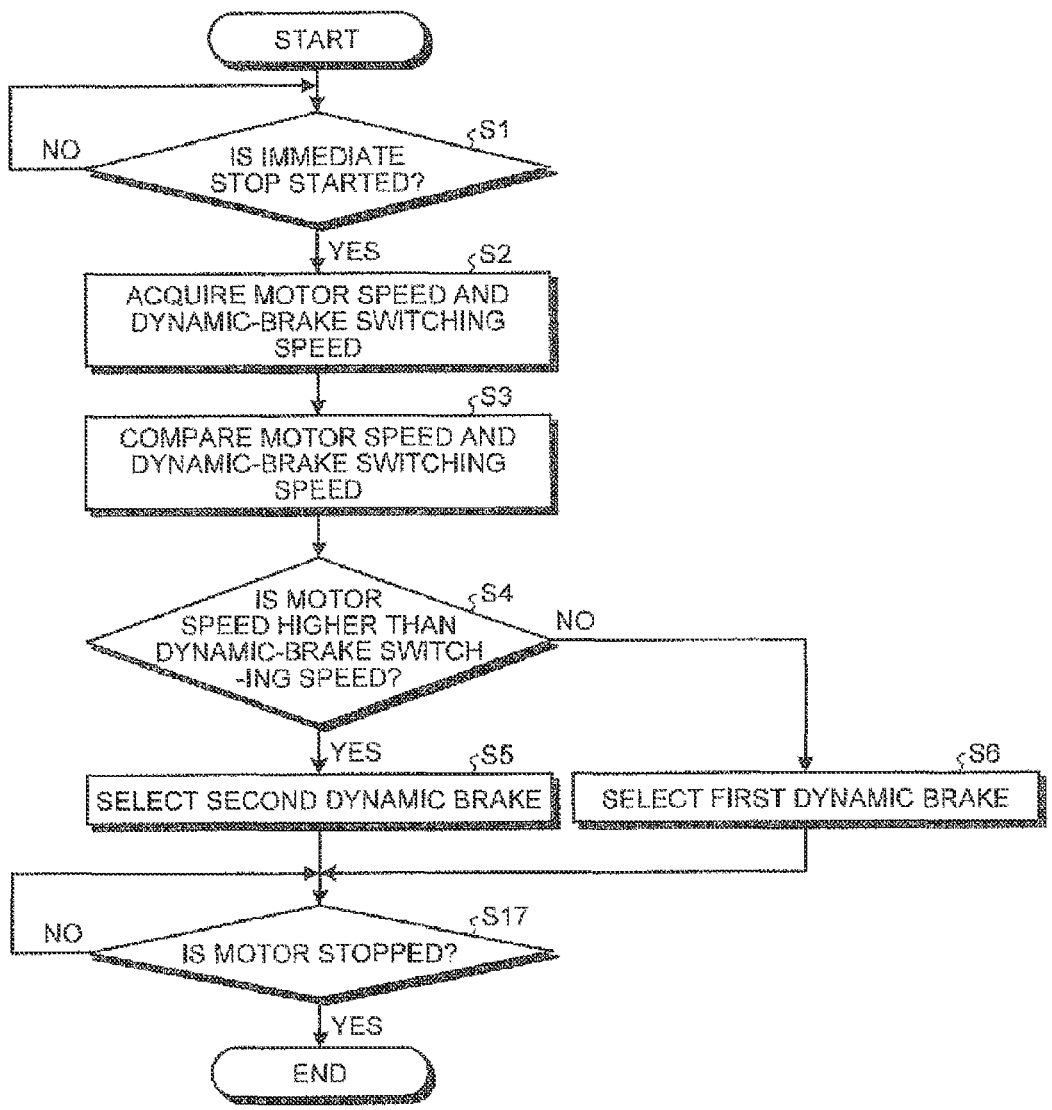
FIG. 5 is a flowchart illustrating the operation of a motor control device according to a modification of the first embodiment.

Alternatively, as illustrated in FIG. 5, it is also possible to configure the brake-switching control unit 6 such that it performs comparison and switching operations only once immediately after the start of an immediate stop. This is instead of performing the comparison and switching operations continuously or regularly from the start of the immediate stop. For example, at Step S17 illustrated in FIG. 5, the brake-switching control unit 6 determines whether the motor M is stopped. For example, the brake-switching control unit 6 acquires a motor speed from the motor-speed calculation unit 5 and determines whether the acquired motor speed is zero. When it is determined that the motor M is stopped (YES at Step S17), the brake-switching control unit 6 ends the process, and when the motor M is not stopped (NO at Step S17), the brake-switching control unit 6 returns the process to Step S17.

In this manner, in the operations illustrated in FIG. 5, the brake-switching control unit 6 compares, right after the start of the immediate stop, a motor speed detected by using a position detector or a speed detector with a dynamic-brake switching speed stored in the switching-speed-value storage unit 7 and, according to the comparison result, the brake-switching control unit 6 selects one of the first dynamic brake 11 and the second dynamic brake 12 as the dynamic brake that brakes the motor M. By using this configuration, it is possible to select a dynamic brake system suitable for shortening a motor stoppage time and a motor stoppage distance in accordance with the speed at the start of an immediate stop; and thus, when compared to a case where the dynamic brake system is fixed, the motor stoppage time and the motor stoppage distance during an immediate stop can be significantly shortened.

Furthermore, in the operations illustrated in FIG. 5, when the motor speed is higher than the dynamic-brake switching speed, the brake-switching control unit 6 selects the second dynamic brake 12 and, when the motor speed is lower than the dynamic-brake switching speed, the brake-switching control unit 6 selects the first dynamic brake 11. By using this configuration, it is possible to select a dynamic brake system suitable for shortening a motor stoppage time and a motor stoppage distance while taking into account the dynamic-brake switching speed, which is a boundary point at which the characteristic of a dynamic brake using dynamic brake resistors and the characteristic of a dynamic brake using switching elements are reversed. Therefore, a motor stoppage time and a motor stoppage distance during an immediate stop can be significantly shortened (for example, shortened to a minimum).

Second Embodiment

A motor control device 100*i* according to a second embodiment is explained next. The following descriptions focus on parts that are different from the first embodiment.

While a case where a motor position or a motor speed is detected has been exemplified in the first embodiment, the second embodiment describes a sensorless configuration in which a motor position or a motor speed is not detected.

Figure 6:
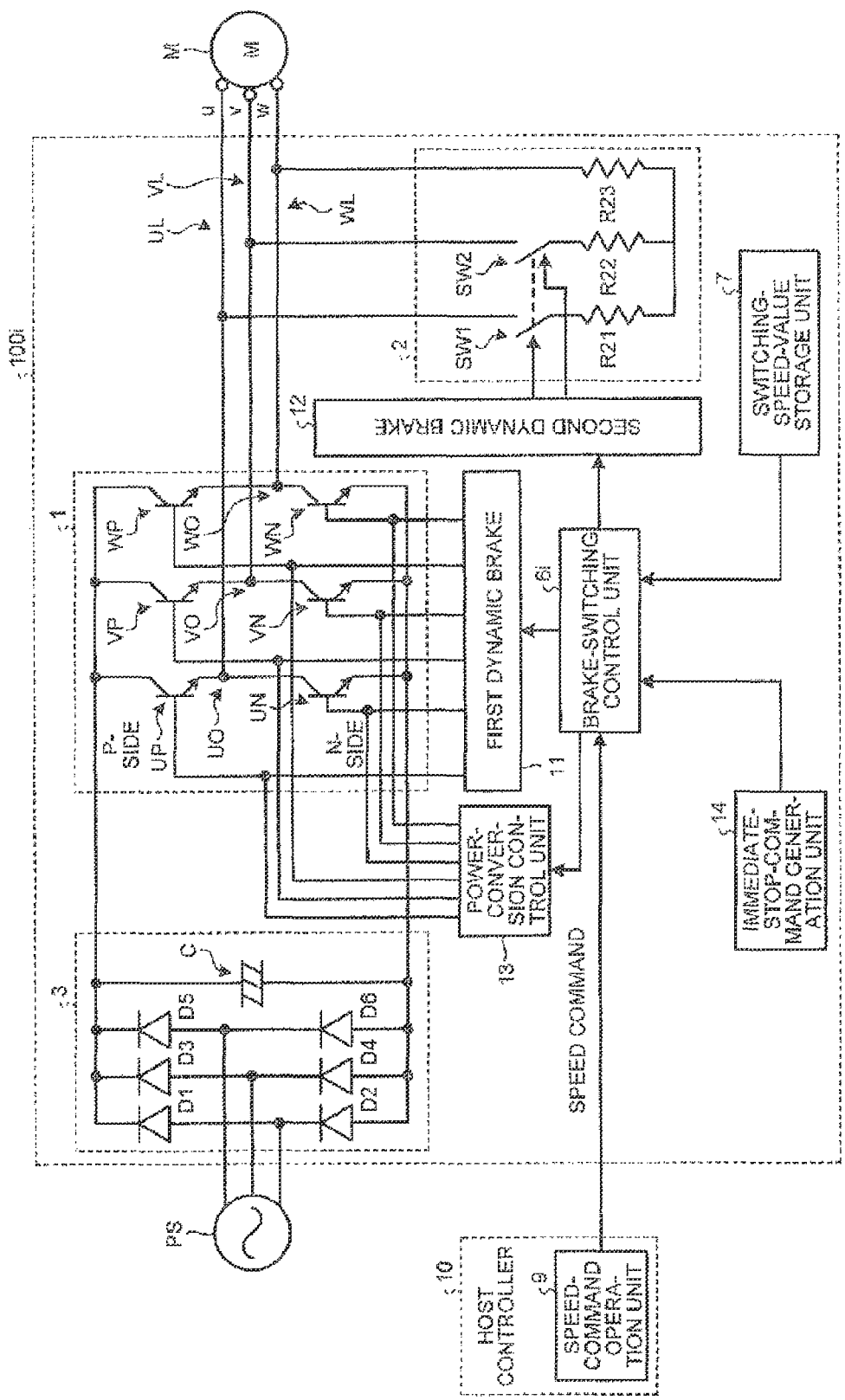
FIG. 6 is a diagram illustrating a configuration of a motor control device according to a second embodiment.

Specifically, as illustrated in FIG. 6, corresponding to the configuration that the position detector ENC is not provided in the motor M, the motor control device 100*i* is configured such that the motor-speed calculation unit 5 (see FIG. 1) is omitted therefrom. Furthermore, in the motor control device 100*i*, a brake-switching control unit 6*i* receives a speed command from a speed-command operation unit 9 of a host controller 10 and performs a process using the received speed command. That is, the brake-switching control unit 6*i* uses a given speed command from the host controller 10 as an alternative to a motor speed acquired from the motor-speed calculation unit 5.

For example, the brake-switching control unit 6*i* compares the given speed command from the host controller 10 with a dynamic-brake switching speed acquired from the switching-speed-value storage unit 7 and, according to the comparison result, switches the dynamic brake that is braking the motor M between the first dynamic brake 11 and the second dynamic brake 12. For example, the brake-switching control unit 6*i* performs switching such that, when the motor speed is higher than the dynamic-brake switching speed, the second dynamic brake 12 brakes the motor M and, when the motor speed is lower than the dynamic-brake switching speed, the first dynamic brake 11 brakes the motor M.

For example, when the motor speed is higher than the dynamic-brake switching speed, the brake-switching control unit 6*i* selects the second dynamic brake 12. That is, the brake-switching control unit 6*i* deactivates the first dynamic brake 11 and activates the second dynamic brake 12. By using this configuration, the second dynamic brake 12 controls the brake resistor circuit 2, and the dynamic brake resistors R21 to R23 are respectively connected between the plurality of motor terminals U, V, and W, thereby braking the motor M.

For example, when the motor speed is lower than the dynamic-brake switching speed, the brake-switching control unit 6*i* selects the first dynamic brake 11. That is, the brake-switching control unit 6*i* activates the first dynamic brake 11 and deactivates the second dynamic brake 12. By using this configuration, the first dynamic brake 11 controls the inverter circuit 1, and all the phases of the plurality of P-side switching elements or all phases of the plurality of N-side switching elements are turned on, thereby braking the motor M.

Figure 7:
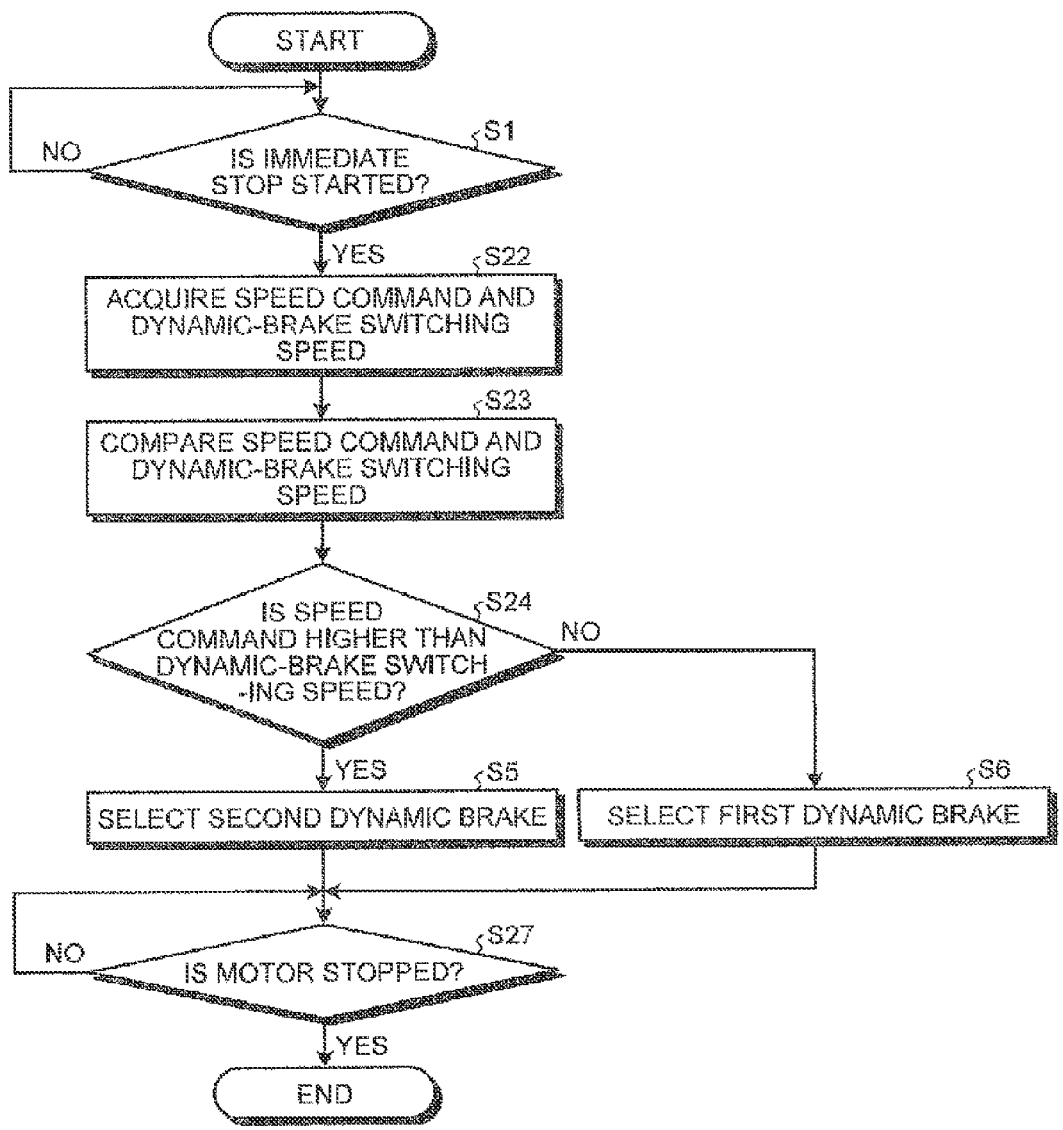
FIG. 7 is a flowchart illustrating an operation of the motor control device according to the second embodiment.

Furthermore, in the second embodiment as illustrated in FIG. 7, the operation of the motor control device 100*i* is different from that of the first embodiment. FIG. 7 is a flowchart illustrating the operation of the motor control device 100*i*.

At Step S22, the brake-switching control unit 6*i* stops a control operation of the power-conversion control unit 13, and it then acquires a speed command and a dynamic-brake switching speed. For example, the brake-switching control unit 6*i* acquires a speed command from the host controller 10, and it also acquires a dynamic-brake switching speed from the switching-speed-value storage unit 7.

At Step S23, the brake-switching control unit 6*i* compares a speed command with a dynamic-brake switching speed.

At Step S24, the brake-switching control unit 6*i* determines whether the speed command is higher than the dynamic-brake switching speed. When the speed command is higher than the dynamic-brake switching speed (YES at Step S24), the brake-switching control unit 6*i* advances the process to Step S5 and, when the speed command is equal to or lower than the dynamic-brake switching speed (NO at Step S24), the brake-switching control unit 6*i* advances the process to Step S6.

At Step S27, the brake-switching control unit 6*i* determines whether the motor M is stopped. For example, the brake-switching control unit 6*i* determines whether the time that has elapsed since the operation of a dynamic brake started has passed a threshold. The threshold time is a time (see FIG. 4) decided in advance and experimentally according to the time between an operation of a dynamic brake started and a time when the motor M stopped. When the elapsed time has passed the threshold time (YES at Step S27), the brake-switching control unit 6*i* ends the process and, when the elapsed time has not passed the threshold time (NO at Step S27), the brake-switching control unit 6*i* returns the process to Step S27.

As described above, in the second embodiment, the brake-switching control unit 6*i* compares a speed command given from the host controller 10 with a dynamic-brake switching speed stored in the switching-speed-value storage unit 7 right immediately the start of an immediate stop and, according to the comparison result, the brake-switching control unit 6*i* selects any of the first dynamic brake 11 and the second dynamic brake 12 as a dynamic brake that brakes the motor M. By using this configuration, it is possible to select a dynamic brake system suitable for shortening a motor stoppage time and a motor stoppage distance in accordance with the speed command at the start of the immediate stop. Therefore, in a sensorless configuration or when sensorless control is executed, when compared to a case where the dynamic brake in the dynamic brake system is fixed, a motor stoppage time and a motor stoppage distance during an immediate stop can be significantly shortened.

Furthermore, in the second embodiment, when the speed command is higher than the dynamic-brake switching speed, the brake-switching control unit 6 selects the second dynamic brake 12 and, when the speed command is lower than the dynamic-brake switching speed, the brake-switching control unit 6*i* selects the first dynamic brake 11. By using this configuration, it is possible to select a dynamic brake system suitable for shortening a motor stoppage time and a motor stoppage distance while taking into account a dynamic-brake switching speed, which is a boundary point at which the characteristic of a dynamic brake using dynamic brake resistors and the characteristic of a dynamic brake using switching elements are reversed. Therefore, in a sensorless configuration or when sensorless control is executed, a motor stoppage time and a motor stoppage distance during an immediate stop can be significantly reduced (for example, reduced to a minimum).

At Step S24 illustrated in FIG. 7, it is also possible that the brake-switching control unit 6*i* determines whether a speed command is equal to or higher than a dynamic-brake switching speed. In this case, when the speed command is equal to or higher than the dynamic-brake switching speed (YES at Step S24), the brake-switching control unit 6*i* advances the process to Step S5 and, when the speed command is lower than the dynamic-brake switching speed (NO at Step S24), the brake-switching control unit 6*i* advances the process to Step S6.

INDUSTRIAL APPLICABILITY

As described above, the motor control device according to the present invention is useful for controlling a motor.

REFERENCE SIGNS LIST

1 inverter circuit, 6, 6i brake-switching control unit, 7 switching-speed-value storage unit, 11 first dynamic brake, 12 second dynamic brake, 100, 100i motor control device.

The invention claimed is:

1. A motor control device comprising:
   an inverter circuit that includes a plurality of P-side switching elements and a plurality of N-side switching elements, and drives a motor via a plurality of motor terminals;
   a first dynamic brake that brakes the motor by turning on all phases of the plurality of P-side switching elements or all phases of the plurality of N-side switching elements;
   a second dynamic brake that brakes the motor by connecting dynamic brake resistors between the plurality of motor terminals; and
   a control unit that switches, according to the motor speed, between the first dynamic brake and the second dynamic brake, which are the dynamic brakes that brake the motor.

2. The motor control device according to claim 1, further comprising
   a switching-speed-value storage unit that stores therein a dynamic-brake switching speed calculated on the basis of a motor constant of a motor connected thereto, wherein
   the control unit compares, continuously or regularly since starting an immediate stop operation, a motor speed detected by using a position detector or a speed detector with a dynamic-brake switching speed stored in the switching-speed-value storage unit; and,
   according to a comparison result, switches a dynamic brake between the first dynamic brake and the second dynamic brake, which are the brakes that brake the motor.

3. The motor control device according to claim 2, wherein
   the control unit performs switching such that the second dynamic brake brakes the motor when the motor speed is higher than the dynamic-brake switching speed, and
   the first dynamic brake brakes the motor when the motor speed is lower than or equal to the dynamic-brake switching speed.

4. The motor control device according to claim 1, further comprising
   a switching-speed-value storage unit that stores therein a dynamic-brake switching speed calculated on the basis of a motor constant of a motor connected thereto, wherein
   the control unit compares, immediately after starting an immediate stop operation, a motor speed detected by using a position detector or a speed detector with a dynamic-brake switching speed stored in the switching-speed-value storage unit; and,
   according to the comparison result, selects one of the first dynamic brake and the second dynamic brake as the dynamic brake to brake the motor.

5. The motor control device according to claim 4, wherein
   the control unit selects the second dynamic brake when the motor speed is higher than the dynamic-brake switching speed, and
   selects the first dynamic brake when the motor speed is lower than or equal to the dynamic-brake switching speed.

6. The motor control device according to claim 1, further comprising
   a switching-speed-value storage unit that stores therein a dynamic-brake switching speed calculated on the basis of a motor constant of a motor connected thereto, wherein
   the control unit compares, immediately after starting an immediate stop, a given speed command that is from a host controller with a dynamic-brake switching speed stored in the switching-speed-value storage unit; and,
   selects, according to the comparison result, one of the first dynamic brake and the second dynamic brake as a dynamic brake to brake the motor.

7. The motor control device according to claim 6, wherein
   the control unit selects the second dynamic brake when the speed command is higher than the dynamic-brake switching speed; and
   selects the first dynamic brake when the speed command is lower than or equal to the dynamic-brake switching speed.

8. The motor control device according to claim 1, wherein, upon starting a stop operation, the control unit controls a dynamic braking of the motor by comparing a motor speed with a certain dynamic-brake switching speed, and switching the dynamic braking between the first dynamic brake and the second dynamic brake based on a comparison result.

* * * * *